(12) United States Patent
Forrest et al.

(10) Patent No.: US 8,253,062 B2
(45) Date of Patent: Aug. 28, 2012

(54) SYSTEM AND METHODOLOGY FOR ZERO-GAP WELDING

(75) Inventors: Mariana G. Forrest, Troy, MI (US); Lu Feng, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1132 days.

(21) Appl. No.: 11/423,230

(22) Filed: Jun. 9, 2006

(65) Prior Publication Data

US 2006/0278618 A1 Dec. 14, 2006

Related U.S. Application Data

(60) Provisional application No. 60/689,771, filed on Jun. 10, 2005.

(51) Int. Cl.
*B23K 26/24* (2006.01)
*B23K 26/32* (2006.01)

(52) U.S. Cl. .............................. 219/121.64; 219/121.76

(58) Field of Classification Search .................. 351/206; 219/121.63, 121.64, 121.76, 121.77, 121.8
See application file for complete search history.

(56) References Cited

U.S. PATENT DOCUMENTS

| | | | |
|---|---|---|---|
| 2,987,610 A | 6/1961 | Steigerwald | |
| 3,131,289 A | 4/1964 | Hansen | |
| 3,151,231 A | 9/1964 | Steigerwald | |
| 3,159,419 A | 12/1964 | Kerby | |
| 3,165,619 A | 1/1965 | Cohen | |
| 3,626,140 A | 12/1971 | Peyrot | |
| 3,746,831 A | 7/1973 | Sciaky | |
| 3,860,784 A | 1/1975 | Brown et al. | |
| 3,881,084 A | 4/1975 | Baardsen | |
| 4,121,087 A | 10/1978 | Malmuth et al. | |
| 4,237,363 A | 12/1980 | Lemelson | |
| 4,251,709 A | 2/1981 | Schumacher | |
| 4,304,979 A | 12/1981 | Dietrich et al. | |
| 4,379,219 A | 4/1983 | Behrens et al. | |
| 4,436,979 A * | 3/1984 | Nilsen ...................... | 219/121.63 |
| 4,539,462 A * | 9/1985 | Plankenhorn ............ | 219/121.79 |
| 4,574,176 A | 3/1986 | Sharp | |
| 4,577,088 A | 3/1986 | Sharp | |
| 4,591,688 A | 5/1986 | Koch et al. | |
| 4,628,179 A | 12/1986 | Crahay | |
| 4,650,954 A | 3/1987 | Frings et al. | |
| 4,656,332 A | 4/1987 | Gross et al. | |
| 4,665,294 A | 5/1987 | Hira et al. | |

(Continued)

FOREIGN PATENT DOCUMENTS

DE 19715102 A1 4/1997

(Continued)

OTHER PUBLICATIONS

Steigerwald, K, 25 Years of Deep-Penetration Electron Beam Welding, pp. 1-2.

(Continued)

*Primary Examiner* — Samuel M Heinrich
(74) *Attorney, Agent, or Firm* — Ralph E. Smith

(57) ABSTRACT

A method for welding includes providing a pair of substrates with no gap between them. The welding process uses lasers that are movable through a locus of points relative to the substrates and each other to weld the substrate together. The movable lasers assist in controlling a formation of a weld keyhole that assists in expelling gases that develop during the welding process.

4 Claims, 7 Drawing Sheets

U.S. PATENT DOCUMENTS

| | | | |
|---|---|---|---|
| 4,667,080 A | 5/1987 | Jüptner et al. | |
| 4,673,794 A | 6/1987 | Ireie et al. | |
| 4,691,093 A | 9/1987 | Banas et al. | |
| 4,694,139 A * | 9/1987 | Roder | 219/121.78 |
| 4,737,612 A | 4/1988 | Bruch et al. | |
| 4,751,365 A | 6/1988 | La Rocca et al. | |
| 4,769,522 A | 9/1988 | Lentz et al. | |
| 4,803,334 A | 2/1989 | Burke et al. | |
| 4,827,100 A | 5/1989 | Frings et al. | |
| 4,899,030 A | 2/1990 | Miyazaki et al. | |
| 4,902,872 A | 2/1990 | Frings et al. | |
| 4,942,285 A | 7/1990 | Ishikawa et al. | |
| 4,945,202 A | 7/1990 | Büdenbender | |
| 4,990,741 A | 2/1991 | Moores et al. | |
| 5,120,926 A | 6/1992 | Marriott | |
| 5,149,937 A * | 9/1992 | Babel et al. | 219/121.68 |
| 5,155,323 A | 10/1992 | Macken | |
| 5,183,989 A | 2/1993 | Sanders et al. | |
| 5,245,156 A | 9/1993 | Kamogawa et al. | |
| 5,250,783 A | 10/1993 | Nishi et al. | |
| 5,268,556 A | 12/1993 | Coyle, Jr. et al. | |
| 5,347,528 A | 9/1994 | Haruta et al. | |
| 5,389,761 A * | 2/1995 | Kresse, Jr. | 219/78.14 |
| 5,410,123 A | 4/1995 | Rancourt | |
| 5,430,816 A | 7/1995 | Furuya et al. | |
| 5,478,983 A | 12/1995 | Rancourt | |
| 5,591,359 A | 1/1997 | Saitou et al. | |
| 5,595,670 A | 1/1997 | Mombo-Caristan | |
| 5,624,585 A | 4/1997 | Haruta et al. | |
| 5,690,845 A * | 11/1997 | Fuse | 219/121.74 |
| 6,359,252 B1 | 3/2002 | Sanjeu et al. | |
| 6,608,278 B1 | 8/2003 | Xie et al. | |
| 6,646,225 B1 | 11/2003 | Wang et al. | |
| 6,740,845 B2 * | 5/2004 | Stol et al. | 219/121.64 |
| 6,750,421 B2 * | 6/2004 | Hermann | 219/121.64 |
| 2004/0173587 A1 | 9/2004 | Musselman | |

FOREIGN PATENT DOCUMENTS

| | | |
|---|---|---|
| DE | 10322449 B3 | 5/2003 |
| DE | 102004020241 A1 | 12/2004 |
| EP | 121 661 A1 | 1/1984 |
| EP | 233 091 A1 | 8/1987 |
| EP | 229 159 B1 | 4/1991 |
| EP | 0 429 369 A1 | 5/1991 |
| EP | 429 368 A1 | 5/1991 |
| GB | 1 336 806 A | 11/1973 |
| GB | 2 200 067 A | 7/1988 |
| JP | 54-018441 | 2/1979 |
| JP | 54-112352 | 9/1979 |
| JP | 55-094786 | 7/1980 |
| JP | 55-136585 | 10/1980 |
| JP | 57-142781 | 9/1982 |
| JP | 58-125380 | 7/1983 |
| JP | 61-169184 | 7/1986 |
| JP | 61-255773 | 11/1986 |
| JP | 61-255774 | 11/1986 |
| JP | 63-252346 | 10/1988 |
| JP | 64-075192 | 3/1989 |
| JP | 03-180286 | 8/1991 |
| JP | 04-210883 | 7/1992 |
| JP | 05-318154 | 12/1993 |
| JP | 06-007984 A | 1/1994 |
| JP | 06-182573 | 7/1994 |
| JP | 06-198472 | 7/1994 |
| JP | 06-190575 | 12/1994 |
| JP | 10263858 | 10/1998 |
| JP | 2002160082 | 6/2002 |
| JP | 2003094185 | 4/2003 |
| JP | 2003290954 | 10/2003 |

OTHER PUBLICATIONS

Elmer et al., Beam Profile Analysis for the S&Ms B231 Electron Beam Welding Machines, LLNL, Technical Information Department, Lawrence Livermore National Laboratory, University of California, Jun. 12, 1997, pp. 1-21.

Mazumder, I, Laser-Beam Welding, ASM Handbook, vol. 6; Welding, Brazing and Soldering, Policy of Units of Measure, ASM International, Dec. 1993, pp. 1-18.

Hiramoto et al., Deep Penetration Welding with High Power CO2 Laser, Proceedings of International Conference on Laser Advanced Materials Processing Science and Applications, May 21-23, 1987, pp. 1-7.

Armenskii, E, Drilling Circular Holes With an Elliptical Electron Beam, Physics and Chemistry of materials Treatment, vol. 22, Issue 2, Mar.-Apr. 1988, pp. 116-118.

Xie, J, Dual Beam Laser Welding, Welding Journal, Oct. 2002, pp. 223-S-230-S.

Miyake et al., Experiment on the Focusing of High Power Millimeter-Wave Beam, Transactions of JWRI, vol. 18, No. 2, Welding Research Institute of Osaka University 1989, pp. 169-174.

Haruta et al., High Power Pulse YAG laser Welding of Thin plate, Proceedings of International Conference on Laser Advanced materials Processing, Science and Applications, Jun. 7-12, 1992 pp. 499-505.

Eichorn, F., High Energy Density Welding-Future Research Directions, International Congress on Welding Research, Jul. 13-14, 1984, pp. 169-171.

Anderson, S., Holographic Imaging Aids Automobile Designers, LaserFocus World, Feb. 1999, p. 5.

Quigley, M., Chapter 8 High Power Density Welding, The Physics of Welding, The International Institute of Welding 1984, pp. 268-291.

Albright et al., High-Speed Laser Welding Discontinuities, Journal of Laser Applications, Fall 1988, pp. 18-25.

Mombo-Caristan et al., High Speed High power Laser Blank Cutting and Welding, ICALEO '99, Laser Materials Processing Conference; Proceedings: Nov. 15-18, 1999, pp. 23-21.

Fowler et al., Ignition and Maintenance of Subsonic Plasma Waves in Atmospheric Pressure Air by CW CO2 Laser Radiation and Their Effect on Laser Beam Propagation, Journal of Applied Physics, American Institute of Physics, 1975; 46(1): pp. 138-150.

Mackon et al., Diode-pumped Nd:YAG Laser for Precision Laser Machining, Journal of Laser Applications, Laser Institute of America, Apr. 1996;8, pp. 225-232.

Jones et al., CO2 Laser Welding of Aluminum Alloys, Proceedings of International Conference on Laser Advanced Materials Processing Science and Applications, Jun. 1992, pp. 523-528.

Polk et al., Laser Processing of Materials, United Technologies Research Center, pp. 357-365.

Miller C., Laswer Welding Article, U.S. Laser Corporation, available at http://www.uslaswercorp.com/envoy/welding.html, Sep. 25, 2006, pp. 1-8.

Huntington et al., Laswer Welding of Aluminum and Aluminum Allys, AWS Annual Convention, Apr. 1982, Welding Research Supplement, pp. 105-s-108-s.

Mannik et al., Laswer Welding of Steels: Relationship Between Laser Power, Penetration Depth, Welding Speed and Beam Polarization, ICALEO 1990, pp. 364-373.

Darchuk et al., The Basics of Laser Welding, Lasers & Applications, Mar. 1985, pp. 59-66.

Williams et al., Melt-Pool and Keyhole Dynamics During Thin Plate Laser Welding of Steel, SPIE vol. 1810 Gas Flow and Chemical Lasers, 1992, pp. 594-598.

Swift-Hook et al., Penetration Welding With Lasers, Welding Journal, Nov. 1973, pp. 492-s-499-s.

Forrest et al., Process Development for Dual Beam Laser Welding of Zinc-Coated Steel Sheets in Lap Joint Configuration Without Gap control at the Interface, IIW 2005, International Institute of Welding—Advances in Automotive Joining Technologies Workshop, 2005, pp. 1-10.

Hoffman et al., Process-Optimizing Adaptive Optics for the Beam Delivery of High-Power CO2 Lasers, Proceedings of SPIE—The International Society for Optical Engineering, vol. 1834, Apr. 1993, pp. 195-205.

Forrest et al., Recent Results on Improved Weld Quality for Laser Lap Welding of Zinc-Coated Steel Sheets Without Gap at the Interface, Sheet Metal Welding Conference XI, May 2004, pp. 1-7.

Ducharme et al., The Laser Welding of Thin Metal Sheets: An Integrated Keyhole and Weld Pool Model With Supporting Experiments, J. Phys, D: Appl. Phys. 27, 1994, pp. 1619-1627.

Powers et al., How High-Energy-Density Beam Welding manufactures Transmission Components, Welding Journal, vol. 47, pp. 47-54.

Deutscher Verband fur Schweisstechnik, Welding and Cutting by High-Power Lasers Having a Rectangular Beam Cross Section, DVS Benched No. 99, Beam Technology, Proceedings 2nd International Conference, Germany, pp. 78-80, Fig. 7.

Bergman et al., Laser Material Processing With 18kW Using a Variable Beam Profile Achieved With a Deformable Optic, University Erlangen-Nürnberg, Germany, pp. 363-369.

Weldingh et al., Very Deep Penetration Laser Welding Techniques and Limitations, 8th NOLAMP Conference, 2001, pp. 1-10.

Parker et al., Industrial Lasers and Their Applications, Chapter 12, pp. 217-231, Prentice Hall, Inc., 1985.

Kuvin B., Laser and Electron Beams for Deep, Fast Welding, Welding Design & Fabrication, Aug. 1985, pp. 34-40.

Kielwasser et al., Physical Process During Pulsed ND: YAG Laser and CW-CO2 Laser Welding of Zinc Coated Steel, Laser Apps. Auto Industry-ICALE0 2000, pp. A10-A21.

Banas C., High Power Laser Welding, The Industrial Laser Annual Handbook 1986 Edition, SPIE vol. 629, pp. 65-375.

Aruga et al., Efficient and High-Quality Overlap Welding of Car-Body Aluminum Alloy Metal Sheets With High Power Nd:YAG Laser by Flexible Fiber Beam Delivery, Proceedings of International Conference on Laser Advanced Materials Processing Science and Applications: Jun. 1992, Osaka japan, pp. 517-522.

Bagger et al., Process Behaviour During High Power CO2 Laser Welding of Zinc Coated Steel, Proceedings of international Conference on Laser Advanced Materials Processing Science and Applications, Jun. 1992, Osaka Japan, pp. 553-557.

Dawes C., Laser Welding of Sheet Metal Fabrications—Process Improvements, Laser Welding, Machining, and Materials Processing: Proceedings of the International Congress on Applications of Lasers and Electro Optics, ICALEO Nov. 1985, pp. 73-80.

Dawes et al., Laser Welding of Deep Drawing Steel Sheet and Microalloyed Steel Plate, Second International Congress on Applications of Lasers and Electro Optics, Nov. 1983, pp. 73-79.

Haferkamp et al., Laser Beam Welding of HSS-Components for Car-Bodies, Proceedings: 25th ISATA Silver Jubilee International Symposium on Automotive Technology and Automation 1992, Osaka, Japan, pp. 173-179.

Katayama et al., Pulse Shape Optimization for Defect prevention in Pulsed Laser Welding of Stainless Steels, ICALEO 1993: Laser Materials Processing: proceedings: Oct. 1993, pp. 487-497.

Kimura et al., Welding Properties With High Power Pulsed CO2 Laser, Proceedings of International Conference on Laser Advanced Materials Processing Science and Applications, May 1987, Osaka, Japan, pp. 169-174.

Kymal C., Laser Welding in High Production, Second International Congress on Applications of Lasers and Electro-Optics, Nov. 1983, vol. 38, pp. 90-96.

Minamida et al., Butt Welding of Thin Stainless Steel Sheets With the 'Rippled Mode' Nd-YAG Laser, ICALEO '91: laser Materials Processing: Nov. 1991, pp. 168-177.

Mombo-Caristan et al., Seam Geometry Monitoring for Tailored Welded Blanks, ICALEO '91: Laser Materials Processing, Nov. 1991, pp. 123-132.

Shinmi et al., Laser Welding and Its Applications for Steel Making Process, Laser Welding, machining, and materials processing: proceedings of the International Congress on Applications of Lasers and Electro-Optics, ICALEO Nov. 1985, pp. 65-72.

Ross et al., Advances in Laser Welding of Automotive Parts, Proceedings: 25th ISATA Silver Jubilee International Symposium on Automotive Technology and Automation, Jun. 1992, pp. 165-171.

Sharp C., Development and Implementation of High Speed Laser Welding in the Can Making Industry, Proceedings of International Conference on Laser Advanced materials Processing Science and Applications, May 1987, pp. 541-547.

Llewellyn S., Laser Welding of High-Speed Roll-Formed Products, Lasers in Manufacturing: Proceedings of the 4th International Conference, May 1987, IFS (Publications) Ltd, Bedford, UK, pp. 297-301.

Moriaki Ono, et al., "Development of Laser-arc Hybrid Welding", Materials Solution Research Center (undated).

Min Xiao, "Nd: YAG-Laser Welding With Dual Beam Technology", NRC Institute for Aerospace Research, Canadian Aeronautics and Space Institute 50th AGM and Conference, 16th Aerospace Structures and Materials Symposium, Montreal Apr. 28-30, 2003, pp. 1-11.

"Dual-Beam Laser Welding Research Available", Insights, vol. 13, No. 1, p. 4 (Jan. 2000).

"Automotive Welding: Industrial Lasers and their Application", Jun. 25, 2001, http://www.industrysearch.com.au/features/carweld.asp M. Kielwasser, et al., "Physical Processes During Pulsed Nd: YAG Laser and CW—CO2 Laser Welding of Zinc Coated Steel", Proc. of Laser Apps. Auto Industry—ICALEO@2000, pp. A10-A21.

J. Xie, "Dual Beam Laser Welding", Welding Journal, Oct. 2002, pp. 223s-230s.

Mariana G. Forrest, "Recent Developments on Laser Welding of Zinc Coated Steel Sheets without Gap at the Interface", Proceedings of ALAC 2003 (Automotive Laser Applications Conference), Sep. 23-25, 2003, Ann Arbor, MI, USA (2003).

Mariana G. Forrest, et al., "Fundamental Study of Dual Beam Laser Welding of Zinc Coated Steel Sheets in Lap Joint Configuration with Zero-Gap", Proceedings of ICALEO 2003 (International Congress on Applications of Lasers and Electro-Optics), Oct. 13-17, 2003, Jacksonville, Florida (2003).

Feng Lu, et al., "Weldability Comparison of Different Zinc Coated High Strength Steel Sheets in Laser Lap Joining Configuration with Zero Gap", Proceedings of ICALEO 2003 (International Congress on Applications of Lasers and Electro-Optics), Oct. 13-17, 2003, Jacksonville, Florida (2003).

Mariana G. Forrest, et al., "Recent Results on Improved Weld Quality for Laser Lap Welding of Zinc-Coated Steel Sheets without Gap at the Interface", AWS—SMWC (Sheet Metal Welding Conference), Sterling Heights, MI, USA, May 11-14, 2004.

Mariana G. Forrest, "Laser Knurling Seam Preparation for Laser Welding of Zinc Coated Sheet Metal—Process Development Preliminary Results", Technical Digest of the 15th International Congress on Applications in Lasers and ElectroOptics (ICALEO '96), Southfield MI, pp. 133, Oct. 14-17, 1996.

Mariana G. Forrest, et al., "A Study of Effects of Laser Welding Process Parameters Variation on Weld Quality for Zn-Coated Thin Auto Body Sheet Materials," Automotive Laser Applications Workshop (ALAW '96), Novi, MI (1996).

E. Abdel-Monew, "Study on Weldability of Zinc-Coated Steel Sheets in Lap Joint Configuration," Steel Research, vol. 68, No. 12, pp. 546-551 (1997).

R. Akhter, et al., "Laser Welding of Zinc Coated Steel," Proceedings of the 5th International Conference on Lasers in Manufacturing, Stuttgart, Germany, IFS Publications, pp. 195-206 (1998).

* cited by examiner

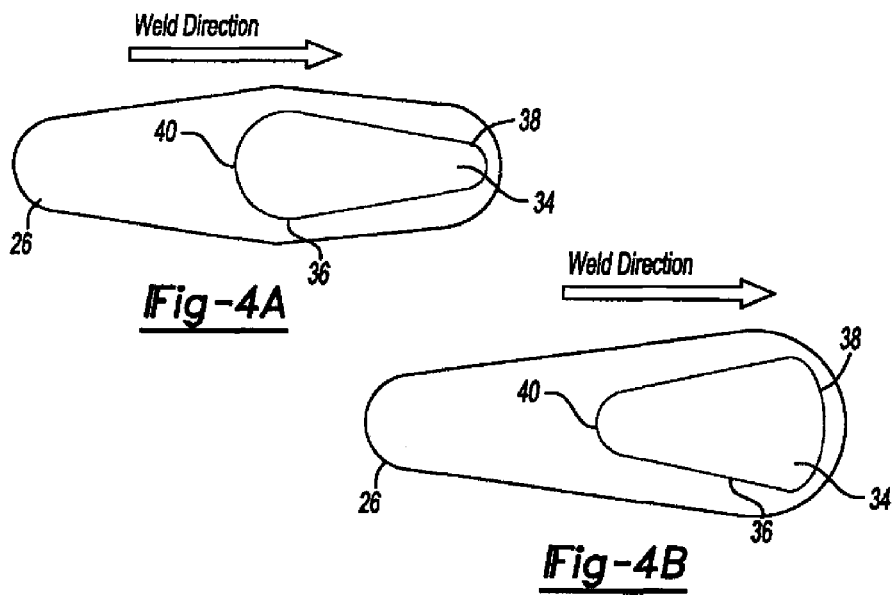
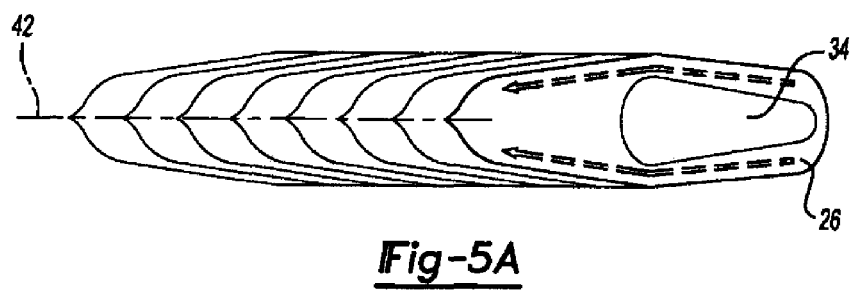
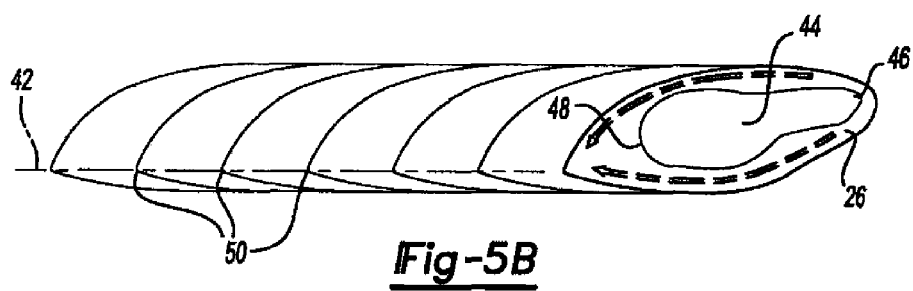

SYSTEM AND METHODOLOGY FOR ZERO-GAP WELDING

CROSS-REFERENCE TO RELATED APPLICATIONS

This application claims the benefit of U.S. Provisional Application No. 60/689,771 filed Jun. 10, 2005. The disclosure of the above application is incorporated herein by reference in its entirety.

FIELD

The present disclosure relates to a system and method for laser welding.

BACKGROUND

The statements in this section merely provide background information related to the present disclosure and may not constitute prior art.

Laser welding has been known and used in the automotive industry, as well as other industries, for some time. Generally, it is known to use lasers to weld steel plates together. It is common to coat these steel plates with a protective coating that inhibits rust and other materials that reduce the useful life of the plates. The use of coatings, such as a zinc coating, for example, results in the plates being galvanized or galvannealed. The use of a coating on the plates, however, causes problems when welding the plates together. That is, the boiling temperature of materials used to coat the plates is different than a melting temperature of the steel used in the plates. As such, when welding the coated plates together, the coating may boil and infiltrate the molten pool of the weld and cause it to spatter, become porous, or both. The spattering and porousness of the weld results in the weld being weak.

To overcome the infiltration of the coating into the molten pool it is common to weld the coated plates together when they are separated from each other by a gap. This gap assists the coating in its gaseous form to be expelled through the gap away from the molten pool. Notwithstanding, the use of a gap is impractical due to increases in manufacturing time and cost.

Accordingly, there is a need for an improved laser welding system and method to reduce spattering and porous welds that are caused by the coating of the plates infiltrating the molten pool of the weld and causing the weld to spatter or become porous. Moreover, it is desirable to be able to weld a pair of coated plates together without having any gap between them.

SUMMARY

In view of the above drawbacks, the present teachings provide a method for welding including providing a pair of substrates with no gap between them. The welding process uses lasers that are movable through a locus of points relative to the substrates and each other to weld the substrates together. The movable lasers assist in controlling a formation of a weld keyhole that assists in expelling gases that develop during the welding process.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 4A and 4B are top views of keyholes according to the present teachings;

FIGS. 5A and 5B are top views of keyholes and associate weld pools according to the present teachings;

DETAILED DESCRIPTION

The following description is merely exemplary in nature and is not intended to limit the present disclosure, application, or uses.

Figure 1:
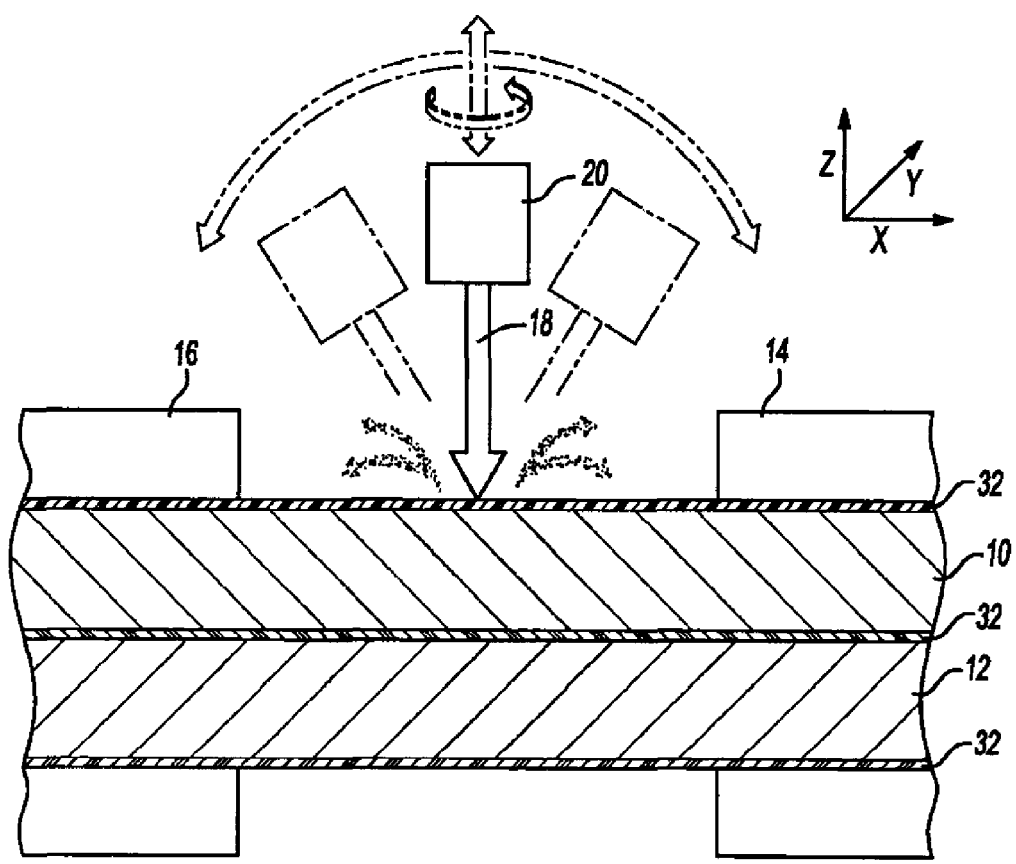
FIG. 1 is a side perspective view of a welding method according to the present teachings.

Referring to FIG. 1, the welding method of the present teachings will now be described. FIG. 1 is a cross-sectional view showing a pair of substrates 10 and 12 held together by a pair of clamps 14 and 16 so that there is no gap, or at least no intended gap, between them. The use of clamps 14 and 16 ensures that the substrates 10 and 12 remain stationary during the welding process, as well as ensure that there is no gap, or at least no intended gap, between them. It should be understood, however, that the present teachings do not require the use of clamps 14 and 16. That is, it is contemplated that merely resting the substrates 10 and 12 on top of one another is sufficient such that there is no gap, or at least no intended gap, between them. As also shown in FIG. 1, it can be seen that a laser beam 18 is directed toward the substrates 10 and 12 from a head 20 to connect the substrates 10 and 12 via a weld.

Although only a single beam 18 is shown in FIG. 1, it should be understood that a plurality of beams may be used. In this regard, it should be understood that the number of laser beams required to weld the substrates 10 and 12 together may be dependent upon the application at hand. Further, it should be understood that the head 20 is movable through a variety of positions relative to the substrates 10 and 12 including in the x-, y-, and z-axis directions. Also, the head 20 is rotatable about the z-axis, can be rolled from side to side, and rotated about the x-axis. Although the head 20 is movable relative to the substrates 10 and 12, the substrates 10 and 12 can also be movable relative to the head 20.

Figure 2:
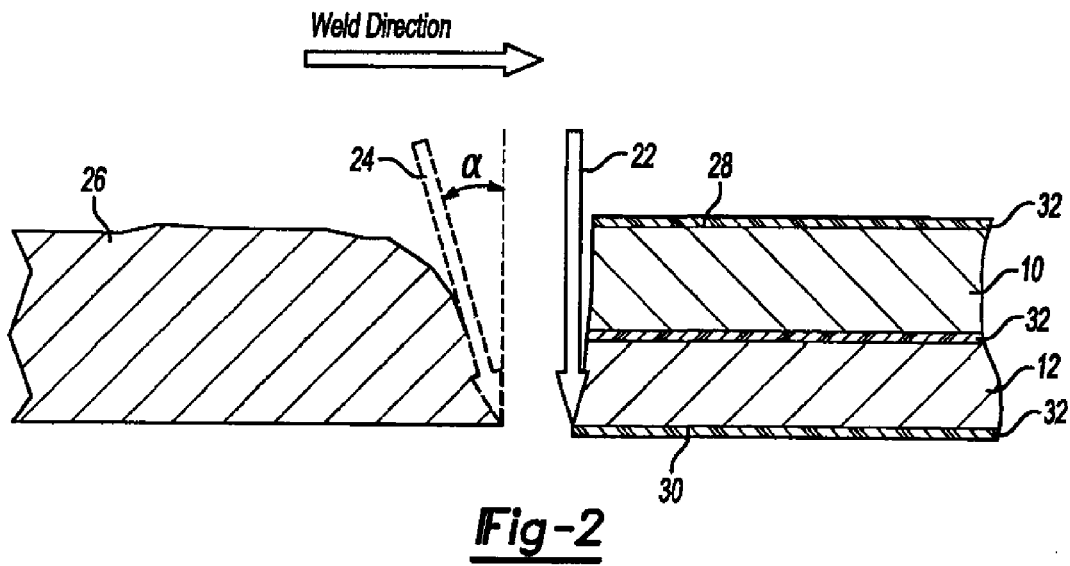
FIG. 2 is a side perspective view of a welding method using dual beam according to another aspect of the present teachings.

Now referring to FIG. 2, a dual laser method according to the present teachings will be described. As shown in FIG. 2, the pair of substrates 10 and 12 are disposed on top of each other such that there is no gap, or at least no intended gap, between them. To weld each of these substrates 10 and 12 together, a pair of laser beams is used. The pair of beams includes a first beam 22 (leading beam) and a second beam 24 (trailing beam) that follows the first beam 22 as the beams 22 and 24 move across the substrates 10 and 12 in a welding direction. As the beams 22 and 24 move across the substrates 10 and 12, the substrates 10 and 12 are sufficiently heated and melted to form a molten pool 26. The molten pool, or weld pool 26, subsequently forms the weld between the substrates 10 and 12 upon cooling.

The leading beam 22 is aligned with the substrates 10 and 12 to be substantially orthogonal to the substrates 10 and 12. With respect to the trailing beam 24, this beam is angled relative to an orientation of the leading beam 22. As shown in FIG. 2, the trailing beam 24 is angled from the leading beam 22 by an angle α. In this regard, it is preferred that the angle by which the trailing beam 24 is angled relative to the leading beam 22 is preferably between 0° and 45°, and more preferably between 10° and 22 °.

It should be understood, however, that the leading beam 22 is not required to be normal to the pair of substrates 10 and 12. In contrast, the leading beam 22 can be angled relative to the substrates 10 and 12 as well. In this regard, it should be understood that the leading beam 22 can be angled in a forward direction, (i.e., in the weld direction) or in a rearward direction (i.e., against the weld direction). It is preferred, however, that if the leading beam 22 is to be tilted, then it should be tilted in the rearward direction.

When engaging the beams 22 and 24 to the substrates 10 and 12, the beams 22 and 24 should be focused at a depth that ranges from an upper surface 28 of the upper substrate 10 to a lower surface 30 of the lower substrate 12. This depth is dependent on a number of parameters including a thickness of the substrates 10 and 12, a thickness of the coatings 32, a power of the lasers, etc. By selecting a focus depth according to the predetermined parameters, each of the beams 22 and 24 can sufficiently engage the substrates 10 and 12 at an intensity that sufficiently melts the substrates 10 and 12 to provide a uniform weld pool 26 in the welding direction. Further, it should be understood that each beam may be focused at different depths.

The lasers used to weld the substrates 10 and 12 together may be any type of laser known to one skilled in the art. In this regard, however, lasers such as a Nd:YAG laser, a $CO_2$ laser, and a ytterbium laser (Yb) are preferred. With respect to a power of these lasers, it should be understood that these lasers are currently commercially available at wattages that range from 1 kW to 30 kW. It should be understood, however, that any power suitable for use of these lasers may be used in accordance with the present teachings.

Moreover, although not shown in FIG. 2, it should be understood that a shape of the beams 22 and 24 can be any shape known to those skilled in the art. In this regard, the shape of the beams 22 and 24 may be circular, elliptical, square, rectangular, or the like without departing from the spirit and scope of the present teachings. What's more, it should be understood that fiber lasers (such as a Yb fiber laser, for example) are beginning to come into use. These fiber lasers are adaptable to be virtually any shape contemplated by one skilled in the art due to the fibers+ ability to be arranged in various configurations. Accordingly, the present teachings should not be limited to the above-mentioned beam shapes.

A distance between the beams 22 and 24, a so-called inter-beam distance, may be determined by the various parameters associated with the welding conditions. That is, the inter-beam distance between the leading beam 22 and the trailing beam 24 will be calculated on a case-by-case basis. Various parameters that should be considered include a thickness of the substrates 10 and 12, the power (wattage) of the lasers, the type of laser being used, and a thickness of any coating 32 that may be disposed on the substrates 10 and 12. Additional factors include a length of the weld and the type of material being used as the substrates 10 and 12.

Each of these factors should be taken into consideration because if the beams 22 and 24 are separated by too great a distance, the trailing beam 24 may generate a concavity in the rear keyhole wall, or an indentation may form in a sidewall of the keyhole. The generation of the concavity or indentation results in a non-stable structure for the molten metal in the weld pool 26 at the keyhole walls that further results in spattering and porosity in the weld. As a result, it is preferred that the inter-beam distance is between −2 and 2 mm. With these inter-beam distances, it should be understood and appreciated that these beams 22 and 24 may overlap. By overlapping the beams 22 and 24, an increase in power density may be achieved which may result in the laser beams more fully engaging the substrates 10 and 12.

The beam strengths are dependent on the type of lasers being used, the laser wattage associated with the laser, and whether the beams are overlapped. It should be understood, however, that the leading beam 22 opens the keyhole in the substrates and the second beam 24 (trailing beam) expands and controls the shape of the keyhole. The shape and orientation of the keyhole is important to controlling the robustness of the welding process and whether or not the weld results in a satisfactory joining of the substrates.

With respect to the types of substrates 10 and 12 that may be used, it should be understood that in an automotive application the substrates 10 and 12 are generally steel that are coated with zinc (Zn). Although Zn is preferably used to galvanize or galvanneal the steel substrates 10 and 12, it should be understood that the present teachings are also applicable to steel substrates that have been coated with other materials. In this regard, it should be understood that in addition to a Zn coating, a magnesium-based (Mg) coating, an aluminum-based (Al) coating, an adhesive coating, or a plastic coating such as polypropylene may be coated on the steel substrates 10 and 12 without affecting the use of the present teachings. Moreover, the present teachings are also applicable to substrates 10 and 12 formed of a material other than steel. In this regard, materials such as aluminum, magnesium, iron, other metals, or alloys thereof may be used.

In using the dual beam method to weld each of the substrates 10 and 12 together, various temporal parameters should also be considered. That is, it should be understood that the leading and trailing beams 22 and 24 may be either continuous beams or pulsed beams. It is preferable that the leading beam 22 be continuously applied during the welding process to engage the substrates 10 and 12. In contrast, the trailing beam 24 may be either a continuous beam or a pulsed beam. What's more, the trailing beam 24 may be positionally modulated (i.e., the trailing beam is movable) throughout the welding process. That is, a position of the trailing beam 24 is adjustable throughout the welding process. This is because, as stated above, the leading beam 22 opens the keyhole while the trailing beam 24 merely expands and controls the shape and orientation of the keyhole. Accordingly, it is not necessary that a continuous beam be used as the trailing beam 24, and it is not necessary that the trailing beam 24 remain stationary throughout the welding process. Nevertheless, it should be understood that depending on the type of application where the welding process of the present teachings is being used, it may be desirable to use a continuous beam instead of a pulsed beam, and vice-versa.

While a continuous or pulsed beam may be used for the trailing beam 24, a laser does not necessarily need to be used as the trailing beam 24. Again, the trailing beam 24 merely expands and controls a size of the keyhole that is formed during the welding process. The trailing beam 24 therefore, may be formed of a laser beam, an electron beam, or a plasma beam. Alternatively, an arc welding device or a diode laser welding device may be used to control the formation of the rear portion of the keyhole. Further, it should be noted that any welding device known to one skilled in the art that may provide the necessary heat at the requisite intensity to expand and control a size of the keyhole may be used in place of the second beam and not depart from the spirit and scope of the present teachings.

While the above description of a leading beam 22 and a trailing beam 24 has been described relative to welding a pair of substrates that overlap each other, it should be understood that the present teachings should not be limited thereto. More particularly, referring to FIG. 3, a dual beam welding method is shown that is beneficial during a deep penetration welding process. The deep penetration welding process may be used when welding a pair of substrates 10 and 12 that must be connected at a location deeper (i.e., at least 6 mm below a surface of the substrate) than a location that is normally used to connect a pair of substrates. For example, welding an engine block at an edge of the block to another substrate.

Figure 3:
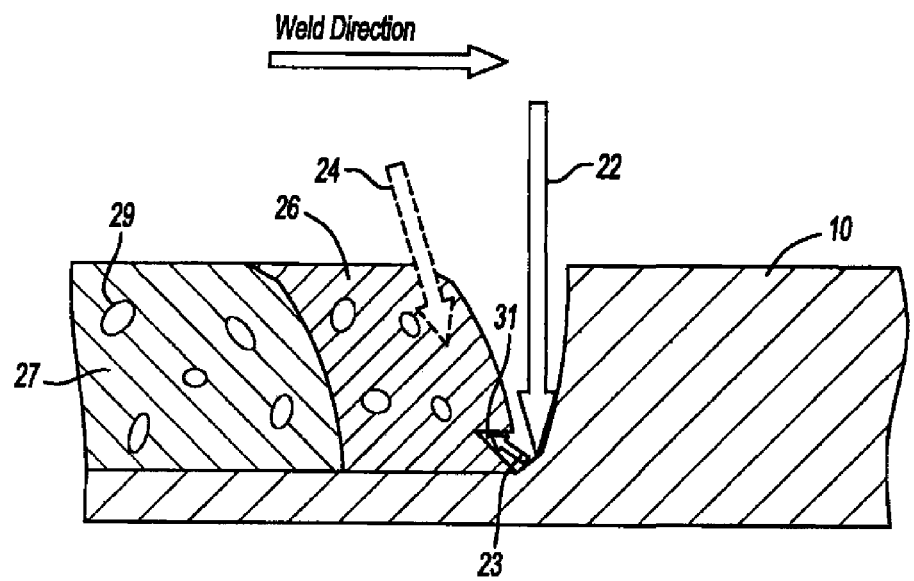
FIG. 3 is a side perspective view of a deep penetration welding method according to the present teachings.

Referring to FIG. 3, it can be seen that the leading beam substantially penetrates a distance into the substrate 10. A problem that arises during these deep penetrations, however, is that the deeply penetrating leading beam 22 may reflect off a surface of the substrate 10 at a root (i.e, bottom) of the keyhole and become a reflected beam 23 that penetrates into the molten pool 26. The reflected beam 23 may form a bump or surface concavity 31 in the molten pool 26 that, as the leading beam moves in the welding direction, will be swallowed by the molten pool 26. Once the bump is swallowed, a pore 29 forms in the weld pool 26 as well as the solidified weld 27. This is undesirable in that a porous weld 27 may be relatively weak.

To combat the formation of the bumps 31 and pores 29, the trailing beam 24 (shown in phantom in FIG. 3) angled relative to the leading beam smooths the molten pool 26 such that the reflected beam 23 does not impinge the molten pool 26 at an angle sufficient to form a bump 31. The smoothing of the molten pool 26 may be adjusted according to an angle of the trailing beam 24. That is, the trailing beam 24 may be angled relative to the leading beam 22 to eliminate, or at least substantially minimize, the formation of bumps 31 that lead to the formation of pores 29.

Now referring to FIGS. 4A and 4B, the keyhole geometry described above will be more fully described. In FIG. 4A, the keyhole 34 when viewed in plan is essentially a conical shape 36 with a rounded first end 38 and second end 40. The first end 38 is formed by the leading beam 22 and the expanding conical shape 36, as well as the rounded second end 40, are formed by the trailing beam 24 which controls and shapes the keyhole 34.

The keyhole 34 is an important aspect of the present teachings because the formation and configuration of the keyhole 34 assists in the expulsion of the gas of the coating 32 that is formed during the welding process. When the substrates 10 and 12 are coated with a coating 32 such as Zn, Mg, Al, or the like, these materials have a boiling temperature that is less than a melting temperature of the steel substrates 10 and 12. As such, during the welding process, these elements are emitted as a gas. Controlling the emission of these gases is important to forming a satisfactory weld that securely fastens each of the substrates 10 and 12 together. This is because the emission of these gasses during the welding process may result in spattering and/or a porous weld which can lead to a weak connection between the substrates 10 and 12.

Controlling the emission of coating gases has a profound effect on the formation of the weld. The expulsion of the gases can be controlled according to Bernoulli's Law which states that $P_1V_1=P_2V_2$.

According to Bernoulli's law, in a tube having varying diameters, the product of gas pressure and gas velocity is constant, independent of a change in tube size. In areas having a small diameter cross-section, the gas has a high velocity and low pressure. In contrast, in areas with a large diameter cross-section, the gas has a low velocity and high pressure. Using this principle, the configuration of the keyhole 34 can be used to control gas evacuation which in turn improves the properties of the weld.

The leading beam 22 creates the narrow portion of the conical structure 36 of the keyhole 34. In this narrow portion of the keyhole 34, the gas will have high velocity and low pressure. The momentum of the gas is opposite the welding direction and believed to be proportional with the welding speed, as well as affected by coating thickness and type.

The trailing beam 24 controls the formation of the remaining portions 40 of the keyhole 34 to have a wider area. In the wider area, the gas will have a low velocity and higher pressure. Due to this increase in the size of the keyhole 34, the velocity of the gas in the keyhole 34 sufficiently slows so that the gas does not impinge on a rear surface 40 of the keyhole 34. In other words, the gas velocity is slowed enough to allow the gas to expel in various directions without contacting a rear surface 40 of the keyhole 34. This prevents, or at least substantially minimizes the spattering caused by the emission of gas from the zinc coating or any other coating. Further, the emission of the coating gas before it impinges on a rear surface 40 of the keyhole 34 also reduces the effect of the weld being porous. Again, this results in a more satisfactory weld bead which increases strength of the weld joining the two substrates.

In contrast, a keyhole as shown in FIG. 4B will not have the desired effect of expelling gas that arises from the coated substrates. Instead, the opposite effect will occur in that the velocity of the gas will increase as it moves toward the rear keyhole wall 40. Again, this is undesirable because gas impinging on the rear keyhole wall 40 increases the likelihood of spattering in the weld.

Although the keyhole 34 shown in FIG. 4A is shown to have smooth sides, the shape of the keyhole 34 can be varied depending on the type of substrates 10 and 12 being used, a thickness of the substrates 10 and 12, a coating thickness, a power of the beams 22 and 24, a diameter of the beams 22 and 24 (or imprint of the beams on the substrates), etc. The primary method of increasing the second or trailing end 40 of the keyhole 34, however, is to use a trailing beam 24 that has a larger beam diameter or imprint compared to the leading beam 22. Preferably, the trailing beam 24 has a beam diameter in the range of 0.03 to 4.00 mm, while the leading beam 22 has a beam diameter in the range of 0.02 to 2.00 mm. More preferably, the trailing beam 24 has a beam diameter in the range of 0.4 to 0.8 mm, while the leading beam has a beam diameter in the range of 0.1 to 0.4 mm. Notwithstanding, one skilled in the art will readily acknowledge and appreciate that various parameters of the welding process can be adjusted according to the specific task where the welding of the present teachings is being used to make the present teachings adaptable to a variety of applications, including automotive applications. For example, although formation of the keyhole 34 has been described using the dual beam method, only a single laser beam is required. This may be accomplished, for example, through movement of the single beam relative to the substrates 10 and 20, or by using a fiber laser with a shape of the fibers being substantially similar to the desired shape of the keyhole 34.

Although a smoothly formed keyhole 34 similar to that shown in FIG. 4A is preferred, other keyhole shapes can be formed without departing from the scope of the present teachings. To form different keyhole shapes, the inter-beam distance may be altered, or the beams 22 and 24 may be off-set from one another. More specifically, referring to FIGS. 5A and 5B, it can be seen that the planes of the trailing and leading beams 22 and 24 can be varied.

As shown in FIG. 5A, each of the beams follows a specific line or axis 42. That is, a center of each of the beams intersects with this axis 42 such that a keyhole 34 similar to that shown in FIG. 4A is formed. In contrast, as shown in FIG. 5B, the leading beam 22 may follow an axis that is offset from the axis 42 of the trailing beam 24 to make a shape of the keyhole 34 irregular. This irregular or non-symmetric keyhole 44 may be desirable in various applications such as when welding substrates at joints or edges. Moreover, the non-symmetric keyhole 44 will have a non-symmetric flow of the molten material 26 as indicated by the arrows. The non-symmetric flow is advantageous in that it eliminates, or at least substantially minimizes, a center-axis porosity of the weld by separating the location of where the two side streams of molten material 26 flowing from the first end 46 toward the second end 48 of the keyhole meet. Further, the non-symmetric flow changes a location of the last solidification point 50 of the molten alloy 26 which also assists in reducing porosity of the weld. Yet another benefit of this non-symmetric flow configuration is the intentional separation of the final solidification surface from the axis where a porosity may form. In this way, the weld's mechanical properties are improved (i.e., strengthened).

Figure 6A:
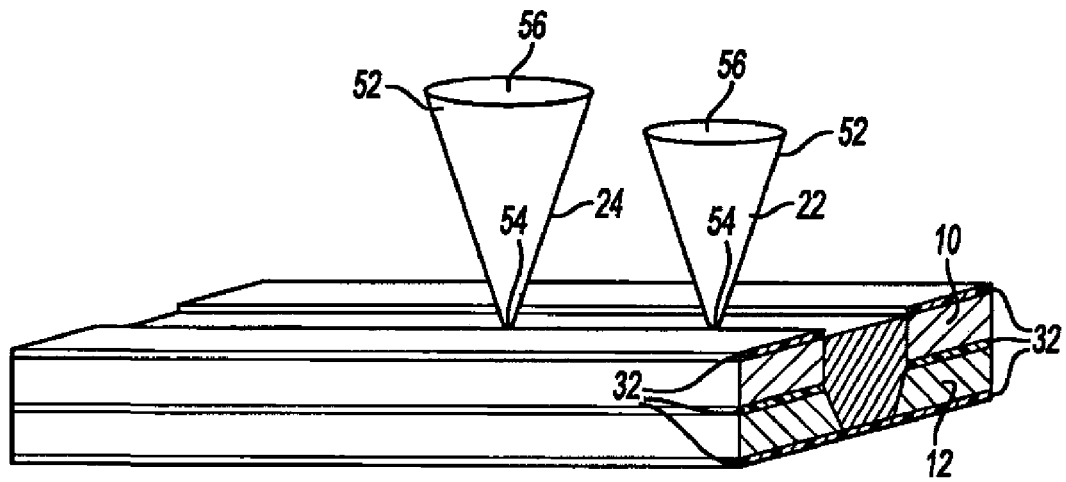
FIGS. 6A to 6C are views depicting various orientations of welding devices according to the present teachings.
Figure 6B:
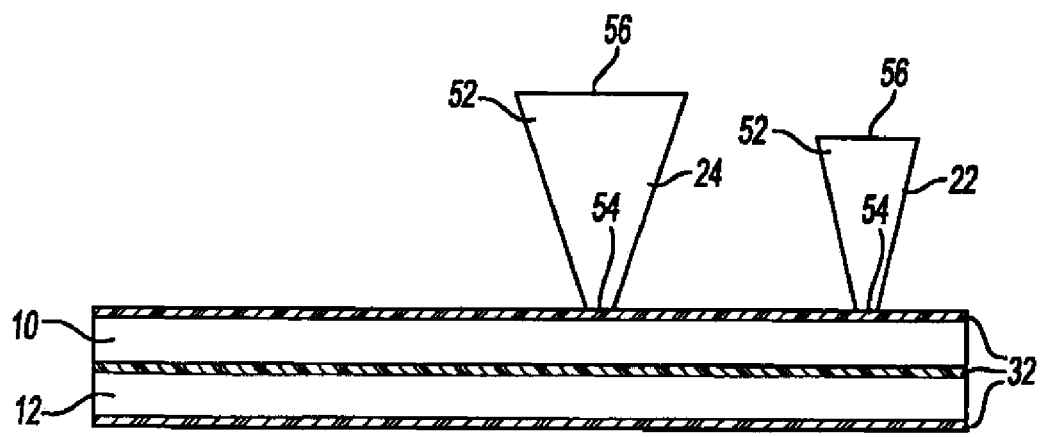
Figure 6C:
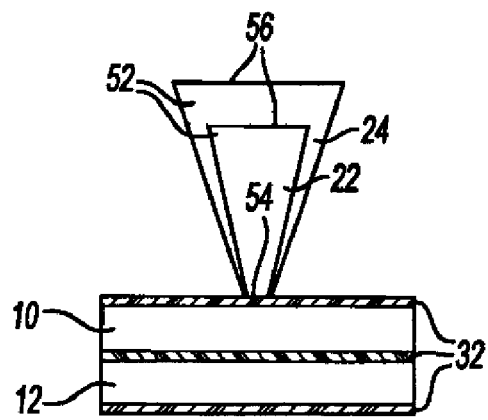

In addition to off-setting the axes that each beam follows in the weld direction relative to each other, both the leading and trailing beams 22 and 24 can have their positions adjusted through a plurality of positions relative to an axis. As shown in FIGS. 6A, 6B, and 6C, it can be seen that each of the beams 22 and 24 can be oriented through a locus of points 52 which is essentially conical in shape. An apex 54 of the conical shape 52 is disposed along an axis in the welding direction in a plane orthogonal to the welding plates 10 and 12. As shown in FIG. 6A, the apexes 54 of the conical-shaped loci 52 are located along the same axis. The bases 56 of the conical-shaped loci 52, however, include a plurality of points expanded outside of a plane that is orthogonal to the axis, which in this case is perpendicular to the substrates 10 and 12, such that a center of each of the beams 22 and 24 may be oriented through each position in the base 56 of the locus 52. That is, the first beam 22 can be oriented out of a plane that runs orthogonal to the axis, angled, or tilted in various directions as long as the apex 54 of the locus 52 stays concentric with a center axis of the weld direction. Moreover, the second beam 24 can also be oriented out of plane, angled, or tilted within the locus 52 so long as the apex 54 is concentric with the center axis of the weld direction. Alternatively, the leading beam 22 can be kept orthogonal to the plates 10 and 12 while the second beam 24 is tilted through a plurality of positions contained within the base 56 of the locus 52. In another alternative embodiment, each beam 22 and 24 can be oriented to different positions suitable for each application contemplated. One skilled in the art will readily acknowledge and appreciate that the use of a conical-shaped locus position of each of the beams 22 and 24 results in the present teachings being used in a variety of different applications. Moreover, although a conical-shaped locus is preferred, the present teachings should not be limited thereto because, as shown in FIG. 1, the welding head 20 is movable in a variety of positions. The plurality of positions through which the welding head 20 can move enables the use of a locus of points relative to the substrate that is hemispherical in shape.

As described above, the present teachings are advantageous when welding substrates 10 and 12 that are disposed over each other with no gap, or at least no intended gap, between them. It should be understood, however, that the present teachings are also advantageously applicable to additional substrate configurations. FIGS. 7A to 7D depict additional substrate configurations that can be welded using the present teachings. In these various configurations, it should also be understood that the dual beams of the present teachings are advantageous because "fit-up" problems between the substrates 10 and 12 may occur during production. That is, various tolerances of the substrates 10 and 12 or other factors may cause the substrates 10 and 12 to not "fit-up" prior to welding. Notwithstanding, with the dual beam method of the present teachings, a more robust process is achievable in that the beams may be oriented in a plurality of positions that assist in overcoming the fit-up problems.

Figure 7A:
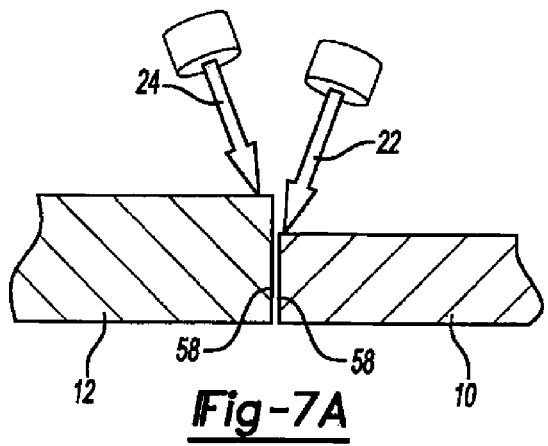
FIGS. 7A to 7D are side perspective views of various applications using welding methods according to the present teachings.

FIG. 7A depicts a configuration where edges 58 of the substrates 10 and 12 abut each other. The welding of plates 10 and 12 in this manner is a butt welding. As shown in FIG. 7A, the welding head 20 may be rotated 90° so that the first and second beams 22 and 24 are disposed laterally to each other when moving in a weld direction instead of "following" each other when the beams 22 and 24 are in an axis that matches the weld direction. Because the beams 22 and 24 are movable through a plurality of points in a predetermined locus 52, the beams 22 and 24 may also be angled relative to each other so that the beams 22 and 24 engage the substrates 10 and 12 at an angle sufficient to melt the substrates 10 and 12 and weld them together. In this regard, it should be understood that the beams 22 and 24, as well as the head 20, may be angled at any position that sufficiently enables the substrates 10 and 12 to be welded.

This configuration is also advantageous when, as shown in FIG. 7A, the substrates 10 and 12 to be welded include different thicknesses. Moreover, because an intensity of each beam 22 and 24 may be adjusted, a thicker plate may be engaged by a beam with a higher power relative to a beam that engages a thinner plate. Although substrates 10 and 12 including different thicknesses are shown in FIG. 7A, it should be noted that the present teachings are adaptable to butt welding substrates 10 and 12 with substantially equal thicknesses as well.

Figure 7B:
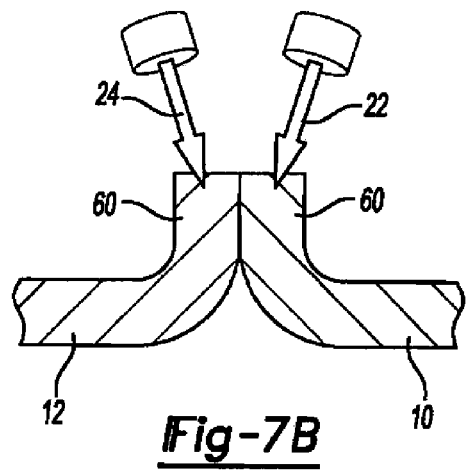

FIG. 7B shows a configuration where bent edges 60 of the substrates 10 and 12 meet each other. This configuration is an edge welding configuration, and the welding head 20 may again be rotated 90° so that the first and second beams 22 and 24 are disposed laterally relative to each other. Again, the beams 22 and 24 may be moved through a plurality of points in each locus 52 so that the proper beam angle, as well as beam intensity, may be used to properly connect the substrates 10 and 12. Although substrates 10 and 12 including the same thickness are used in FIG. 7B, it should be understood that substrates 10 and 12 with different thicknesses may be welded together without departing from the scope of the present teachings.

Figure 7C:
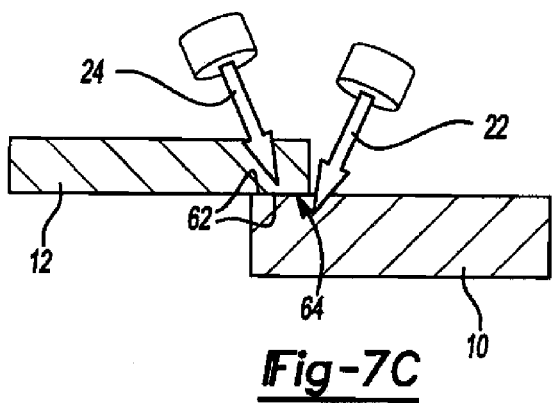

FIG. 7C is a configuration where edges 62 of the substrates 10 and 12 overlap each other to form a lap joint 64. In this configuration, the welding head 20 may be rotated 90° so that the first and second beams 22 and 24 are disposed laterally to each other. In this manner, the beams 22 and 24 may be moved through their respective locus 52 to the appropriate position and angle to ensure proper welding of the substrates 10 and 12. Alternatively, the beams 22 and 24 may be aligned in a plane that is in line with a weld direction. More particularly, the beams 22 and 24 may be aligned similarly to the configuration shown in FIG. 6C. Regardless, it should be understood that each of the beams 22 and 24 may moved in various positions relative to each other to ensure a proper weld between the substrates 10 and 12.

Figure 7D:
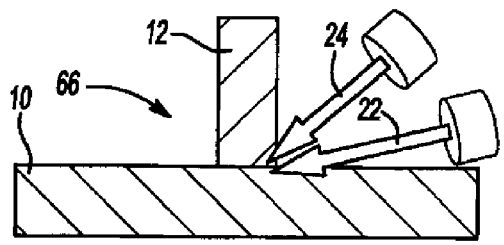

Now referring to FIG. 7D, the substrates 10 and 12 are in a T-joint configuration 66. When the substrates 10 and 12 are disposed in a T-joint configuration 66, the welding head 20 may be rotated 90° as well as angled relative to the T-joint 66 so that the first and second beams 22 and 24 are disposed laterally while engaging the substrates 10 and 12 in an angled manner. The maneuverability of the beams 22 and 24 enables the beams 22 and 24 to precisely engage the substrates 10 and 12 in the T-joint 66 at the necessary angle to ensure a sufficient weld. Again, it should also be understood that the intensity of the beams 22 and 24 may also be properly adapted to properly connect the substrates.

It should be understood that although the head 20 has been described above as being rotatable 90°, the head in actuality may be rotated through 360° such that the beams 22 and 24 can be positioned relative to the substrates 10 and 12 in a variety of positions. For example, the head 20 may be rotated through an angle that enables the beams 22 and 24 to form a weld pool 26 similar to that shown in FIG. 5B, even when welding substrates 10 and 12 in the configurations shown in FIGS. 7A to 7D.

Figure 8:
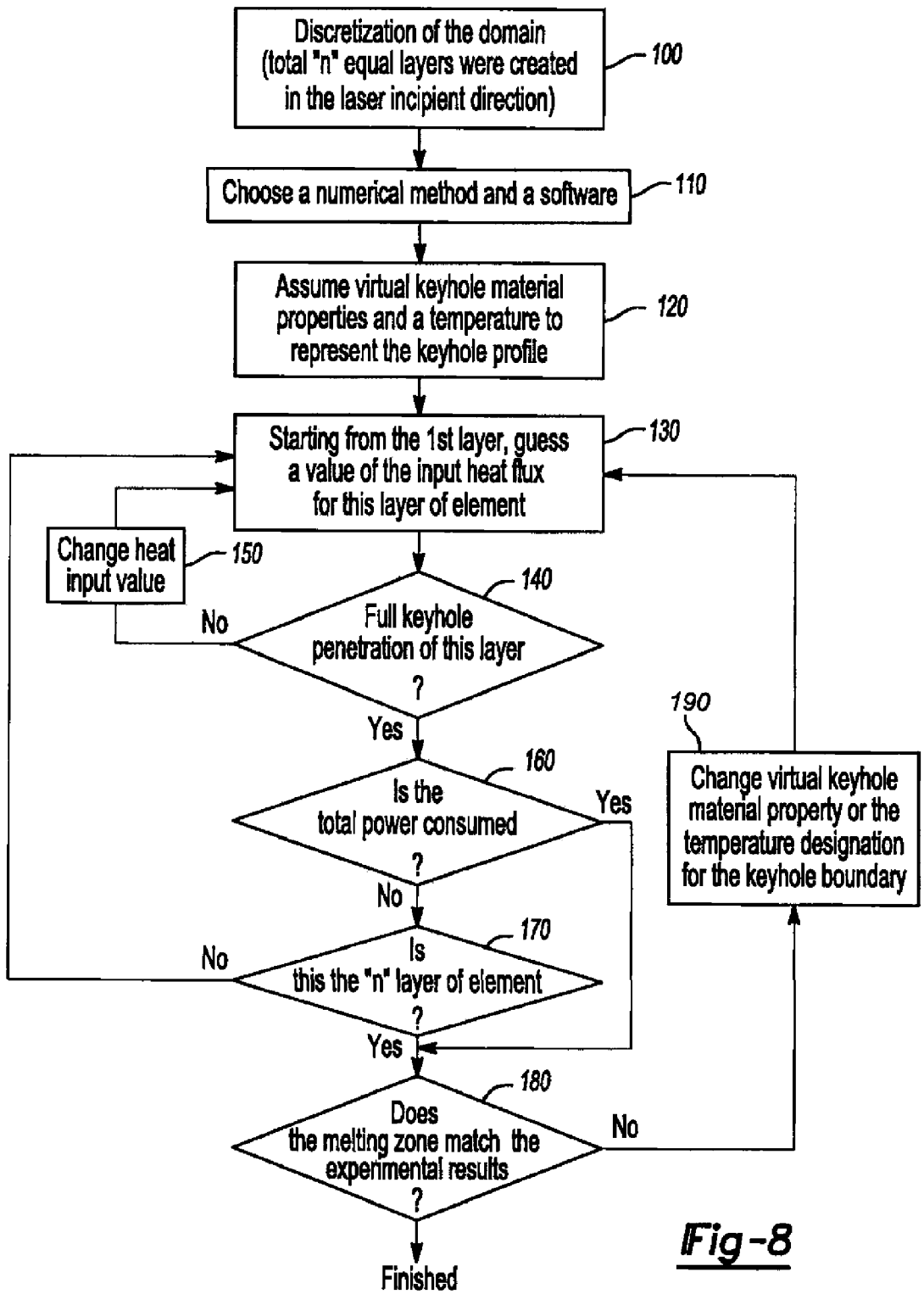
FIG. 8 is a flow chart outlining a method for virtually determining welding parameters in association with the present teachings.
Figure 9:
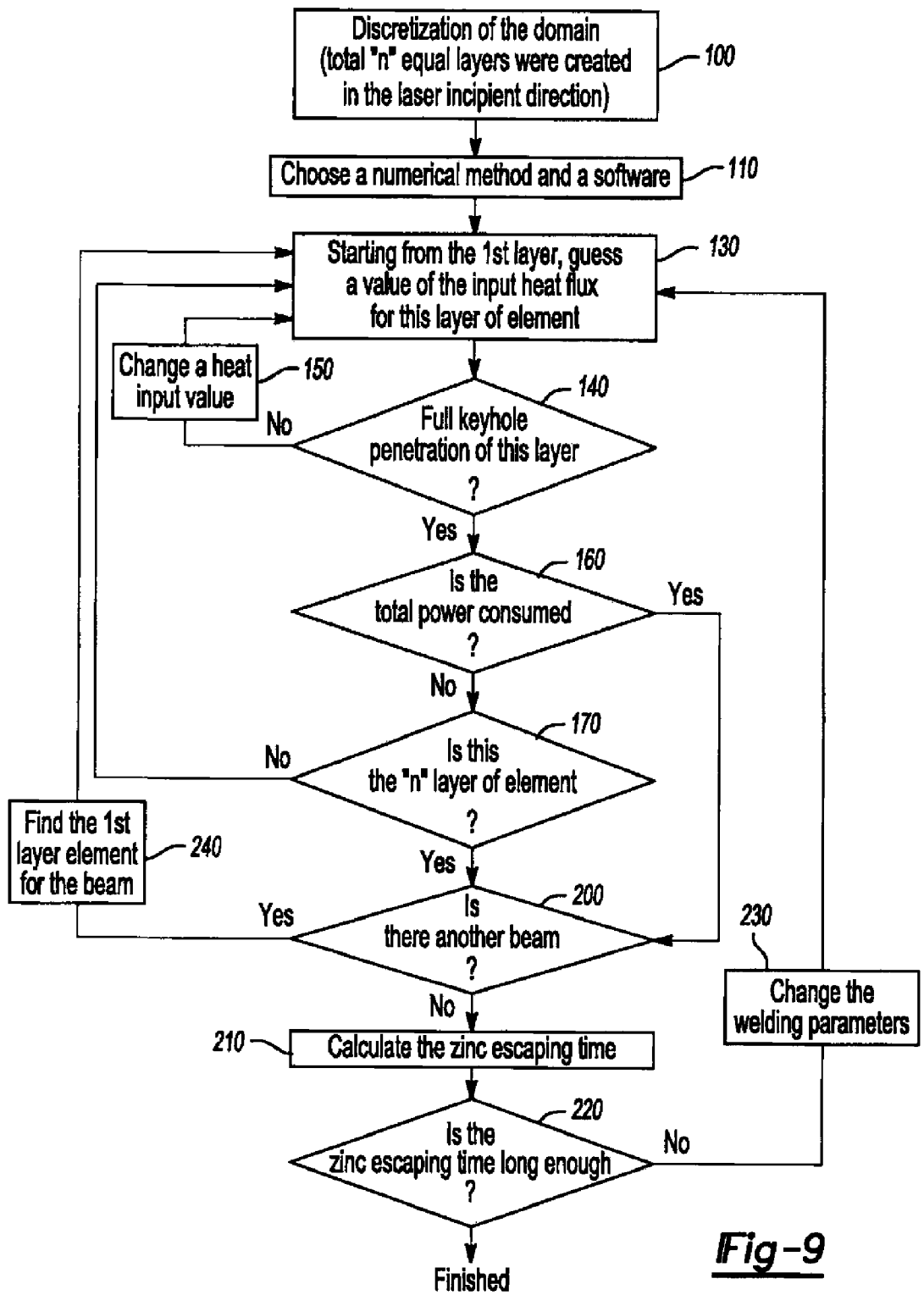
FIG. 9 is another flow chart outlining a method for virtually determining welding parameters in association with the present teachings.

Now referring to FIGS. 8 and 9, a methodology for virtually determining the optimal parameters associated with each welding application utilizing the present teachings will be described. The flow charts in FIGS. 8 and 9 outline the steps taken to determine the virtual welding parameters required for each application. The parameters that may be determined include, but should not be limited to, a welding speed, a laser spot size for each beam, an inter-beam distance, an angle between the beams, a beam intensity, the laser cross-sectional shape, and the like. Numerical methods used to determine the parameters can be carried out using a finite element analysis (FEA), a finite difference method (FDM), or a finite volume method (FVM). Commercially available software packages such as, for example, ABAQUS and ANSYS, can also be used to conduct the FEA, FDM, or FVM.

In step 100, a domain to be studied is divided into a series of discrete layers of elements. This process is called discretization. During discretization, it is preferable that, in a direction where the laser is incipient to the material, the size of the layers of elements are kept equal. If there is any interface between the substrates, the interface must be aligned with element boundaries.

Next, a numerical method (i.e., FEA, FDM, or FVM) and a commercial software program to conduct the numerical method is chosen in step 110. The numerical method and software must be able to perform a transient heat transfer analysis. As stated above, the chosen numerical method may be performed using commercially available software such as ABAQUS and ANSYS.

Then, in step 120 virtual keyhole material properties should be assumed. Physically, the keyhole does not contain any solid or liquid material. Because certain numerical methods can only be carried out on solid or liquid materials (such as FEM, for example), a virtual material must be assumed for the keyhole volume. Its properties such as heat capacity and thermal conductivity, for example, must be initially assumed and then calibrated in a later calibration phase. Generally, the initial virtual keyhole material property is selected to be a known highest temperature molten material value.

An isothermal temperature profile for the keyhole must also be chosen. The high temperature isothermal curve is chosen as a boundary of the keyhole. The temperature corresponding to the chosen isothermal curve may be calibrated later, together with the virtual keyhole material property.

Next, in step 130 energy consumption on the first layer of elements should be calculated. At the location where the laser beam is incipient to the material, a surface input heat flux is applied. The heat flux can be fixed or moved along the surface. Different input energies for the surface flux may be attempted until the derived keyhole profile boundary touches, or is at least tangential to, the element's bottom boundary. Then, the value of the input energy is the correct value to be calculated for this layer of elements. If a full penetration for this layer is not achieved (step 140), the heat input value should be recalculated (step 150). That is, if the value of the input energy is not correct such that the derived keyhole profile boundary does not touch the layer of element's bottom boundary, the heat input value needs to be recalculated.

Then, energy consumption of the second layer of elements is calculated. With the heat flux energy derived for the first layer of elements applied, different energy values for the second layer of element's heat flux may be attempted until the value that enables the keyhole profile to touch or be tangential to the bottom boundary of the second layer of element's boundary is determined. This is the correct value to be calculated for the second layer.

After the first and second layer energy consumptions have been calculated, the energy for each subsequent layer of elements should be calculated sequentially until each layer of elements in the domain is calculated. For each subsequent layer of elements in the sequence of layers, the energy value derived from the previous layer should be applied first. Then, different energy input values may be tried on the layer of elements until the keyhole profile just touches the bottom boundary of the next layer. This value should be recorded as the required input energy for this layer.

After calculation for each layer of elements, the total depth of penetration (step 170) and total energy consumption (step 160) should be checked to determine if full penetration is achieved or total power available is used up. If the full penetration is achieved (step 170) before total available laser energy is consumed, the extra energy is assumed to be transmitted (wasted) to the other side of the keyhole. If a full penetration is not achieved and the total energy is not used up, the calculation should be repeated for the next subsequent layer of elements (steps 130 to 170). The final keyhole profile is determined either after the last layer of elements ($n^{th}$ layer) has been calculated, or when the total available energy is fully consumed at a certain layer of elements.

Now, calibrations should be performed. In this regard, calibration is conducted by comparing a molten zone of the laser irradiated material with the molten zone around the keyhole predicted by the virtual model (step 180). A variety of situations may also be compared. For example, single substrate, multiple substrate, different laser intensities, and the like may be compared. If the molten zone does not match the experimental results, the virtual keyhole material property or the temperature designation for the keyhole boundary must be changed (step 190). This calibration is intended to adjust the virtual keyhole material property and isothermal temperature for the keyhole profile to be suitable for each situation. Subsequently, the model can be stored in a database to be used in future applications.

The above methodology has been described relative to the use of a single laser beam. Notwithstanding, according to the present teachings, a plurality of laser beams may be used (FIG. 9). In such a case, the steps described above should be repeated for each layer of elements of the domain, and the calculation process should be repeated for each beam beginning from the leading beam (step 200). For each additional or subsequent beam, the calculation should begin at the layer of elements where the rear keyhole wall formed by the previous beam intersects with the current beam being calculated (step 240).

Lastly, the welding parameters should be examined with respect to both a coating gas emission time and the resulting keyhole profile. The emission times should be calculated for emissions at the substrate/substrate interface, as well as the first and second ends of the keyhole (step 210). The coating gas emission time is calculated by dividing the length of the keyhole by welding speed. The coating gas emission time must be larger or equal to a value determined by both experiment and calculation before (step 220). Moreover, the resulting keyhole profile should be smooth and without concavity. Otherwise, this combination of parameters is not capable of making good welds. Accordingly, various welding parameters (i.e., welding speed, laser spot size for each beam, inter-beam distance between each beam, laser intensity, laser cross-sectional shape, etc.) should be changed (step 230) to account for a correct coating gas emission time and keyhole profile.

What is claimed is:

1. A method comprising:
   providing a pair of substrates; and
   welding said substrates together simultaneously with a first laser and a device selected from the group consisting of a second laser, an electron beam device, a plasma beam device, an arc welding device, and a diode welding device;
   wherein said first laser is independently movable relative to a surface of said substrates and said device through a first conical-shaped locus of points, and said device is independently movable relative to said surface of said substrate and to said first laser through a second conical-shaped locus of points.

2. The method of claim 1, further comprising controlling formation of a keyhole in said substrates.

3. The method of claim 1, further comprising controlling formation of a keyhole in said substrates by forming a first end of said keyhole with said first laser, and forming a second end of said keyhole with said device;
   wherein said first end has a smaller cross-section than said second end.

4. The method of claim 3 wherein said first and second substrates include a coating, and a shape of said keyhole controls an expulsion of said coating during welding.

* * * * *